United States Patent [19]

Hanna

[11] Patent Number: 5,614,280

[45] Date of Patent: Mar. 25, 1997

[54] SHIELDING BLANKET FOR RACING ENGINES

[75] Inventor: Thomas Hanna, Wichita, Kans.

[73] Assignee: James W. Post, III, Franklin Park, Ill.

[21] Appl. No.: 160,723

[22] Filed: Dec. 2, 1993

[51] Int. Cl.⁶ ............................ B60R 21/00; B60R 27/00
[52] U.S. Cl. ........................... 428/74; 428/99; 428/100; 428/102; 428/911; 150/157; 180/69.1; 180/346; 123/198 E; 74/608
[58] Field of Search .................. 428/99, 100, 102, 428/911, 76, 74; 150/157; 123/198 E; 180/69.1, 346; 184/106; 74/608

[56] References Cited

U.S. PATENT DOCUMENTS

| | | | |
|---|---|---|---|
| 925,783 | 6/1909 | Miller | 74/608 |
| 971,550 | 10/1910 | Mullins | 74/608 |
| 1,163,317 | 12/1915 | Brush | 74/608 |
| 1,182,378 | 5/1916 | Jewell | 74/608 |
| 1,327,891 | 1/1920 | Upson | 74/608 |
| 2,498,113 | 2/1950 | Milner | 150/157 |
| 3,455,409 | 7/1969 | Clark | 74/608 |
| 3,491,847 | 1/1970 | Abbott | 180/82 |
| 3,602,602 | 8/1971 | Motta | 415/9 |
| 4,308,931 | 1/1982 | Khanna | 180/235 |
| 5,193,415 | 3/1993 | Massel | 74/606 R |

Primary Examiner—Alexander Thomas
Attorney, Agent, or Firm—Andrew R. Basile

[57] ABSTRACT

A shielding blanket for racing engines includes a bag constructed of a lamination of materials including several plies of a high-strength ballistic textile material laminate having a high melting point. The blanket is shaped to fit closely over the cylinder block and oil pan of the engine, and between the block and the exhaust headers. Oil-absorbent pads are secured within the bag for capturing engine oil. Two of the pads face the sides of the cylinder block to prevent oil from escaping through either the engine block or the oil pan from reaching the exhaust headers.

18 Claims, 3 Drawing Sheets

SHIELDING BLANKET FOR RACING ENGINES

BACKGROUND OF THE INVENTION

This invention relates generally to automotive engineering and more particularly to a shielding blanket for racing engines. The blanket is intended to contain parts and help prevent fire, in the event of severe engine failure.

Prior inventors have proposed devices to control shrapnel produced during engine failures. Great progress has been made in this aspect of racing safety. For example, clutch and flywheel explosions, once quite a danger to drag racing participants and spectators, are no longer major concerns, because of the effectiveness of commonly used shields and transmission blankets that contain clutch and flywheel parts when those parts disintegrate. Similarly, supercharger tethers and other restraints prevent superchargers from being launched into the crowd, as once they occasionally were.

A problem which remains unsolved, however, is to contain engine parts and oil when the lower end of an engine fails. Typically, a piston or connecting rod breaks, the crankshaft pushes the connecting rod through the side of the engine block casting, and other failures rapidly ensue. Any number of rapidly moving parts may suddenly leave the confines of the engine, and perhaps the engine compartment, making the description "grenading" apt. The driver and spectators risk injury from flying metal objects, and the rear tires of the vehicle may be punctured. But even when shrapnel is not produced, it is common for the engine's oil to escape during engine failure. The release of several quarts of oil, much of it finely atomized, frequently results in fire, since the engine's exhaust headers ordinarily run well above the ignition temperature of oil. Headers are a likely target for escaping oil, since they pass only inches from the sides of the engine and the oil pan. And even when fire does not ensue, the race track is spread with oil—a danger to subsequent traffic, requiring time-consuming intervention by race officials. So, oil containment, and ultimately fire safety, are important considerations.

Some inventors have addressed the oil spillage problem. The solutions they proposed range from simple mats designed to keep one's garage floor clean to belly pans and like devices intended to catch spilling oil. These prior devices were not supposed to catch a whole crankcase full of hot oil, suddenly released, and would not have reliably kept the oil off the exhaust headers. Neither were prior oil restraints designed to retain all engine parts during mechanical engine failure. This invention aims, ideally, at performing both functions. It should be recognized, however, that the most catastrophic failures may be difficult to contain.

It may be observed that a fire sometimes precedes engine failure. For example, should the front end of the crankshaft break off, oil could escape and ignite within the engine compartment. The engine may explode moments later. So a physical restraint for shrapnel should retain its strength for as long as possible in the presence of fire.

SUMMARY OF THE INVENTION

An object of the invention is to contain engine parts released from the lower end of a racing engine during engine failure.

Another object of the invention is to contain oil released from an engine during engine failure, and thus to improve fire safety.

A further object of the invention is prevent release of oil onto a race track following engine failure.

These and other objects are attained by a race engine shield in the form of a bag constructed of a high-strength textile material having a high melting point. The bag is constructed to fit closely over the cylinder block and oil pan of the engine, and between the block and the exhaust headers, and has straps for holding the bag in place on the engine. Oil-absorbent pads are placed within the bag for rapidly absorbing engine oil, along the sides of the cylinder block, to prevent oil escaping through the block or the oil pan from reaching the engine's exhaust headers.

Besides providing a physical restraint for failed engine parts, the invention helps prevent fires by capturing oil. It does so not by physically confining the oil—to hermetically seal a flexible bag around the unpredictable irregularities of a racing engine would be very difficult—but rather by rapidly absorbing oil as it escapes. Oil does not burn, or at least not quickly, when it has been absorbed in a pad, and by intercepting oil before it can strike the headers, the invention aims to prevent fire, at least a car-engulfing inferno. So, besides potentially saving the driver, the invention is also expected to reduce the amount of fire damage a car sustains following an bottom-end engine failure.

Since engine terminology is inconsistently used, to clarify the following description, a few terms are defined below:

1. Cylinder block (or engine block, or simply "block")—the metal casting defining the engine's cylinders. The block also supports a crankshaft that reciprocates pistons in the cylinders, via respective connecting rods.
2. Oil pan—the sheet metal pan covering the bottom of the cylinder block, and confining the engine oil therein. Oil collected by the pan is returned to the oil pump by an oil line which may run outside the cylinder block.
3. Cylinder heads—machined castings which cover the tops of the cylinders and have intake and exhaust ports to pass gases to and from the cylinders.
4. Exhaust headers—tubing sets connected to the heads over the exhaust ports, to lead exhaust gases out of the engine compartment.
5. Bottom end—the cylinder block, crankshaft, connecting rods, pistons and oil pan, in combination.

Other terms are intended to have their ordinary, generally accepted meaning.

BRIEF DESCRIPTION OF THE DRAWINGS

In the accompanying drawings.

DESCRIPTION OF THE PREFERRED EMBODIMENT

Figure 1:
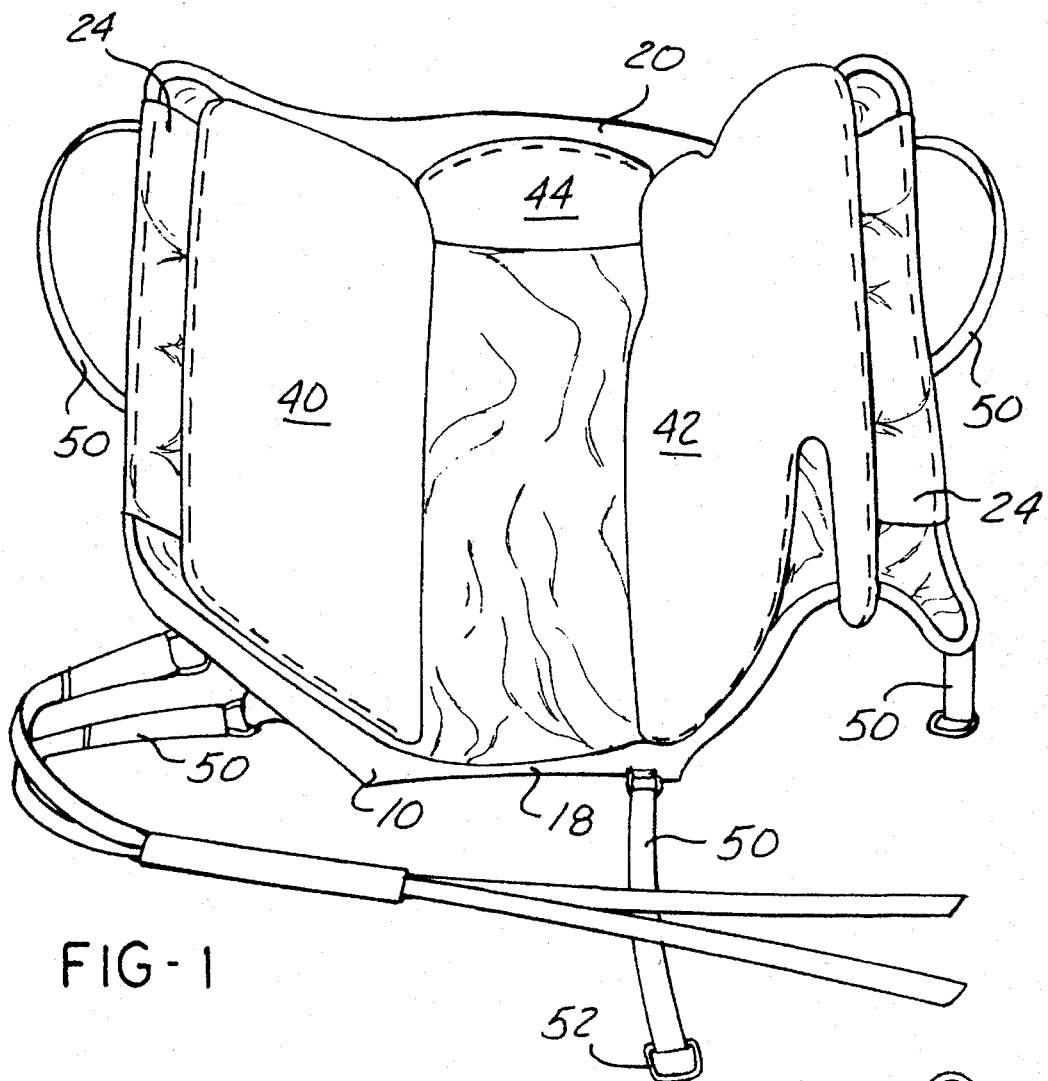
FIG. 1 is a perspective view, from above, of a shielding blanket embodying the invention.
Figure 2:
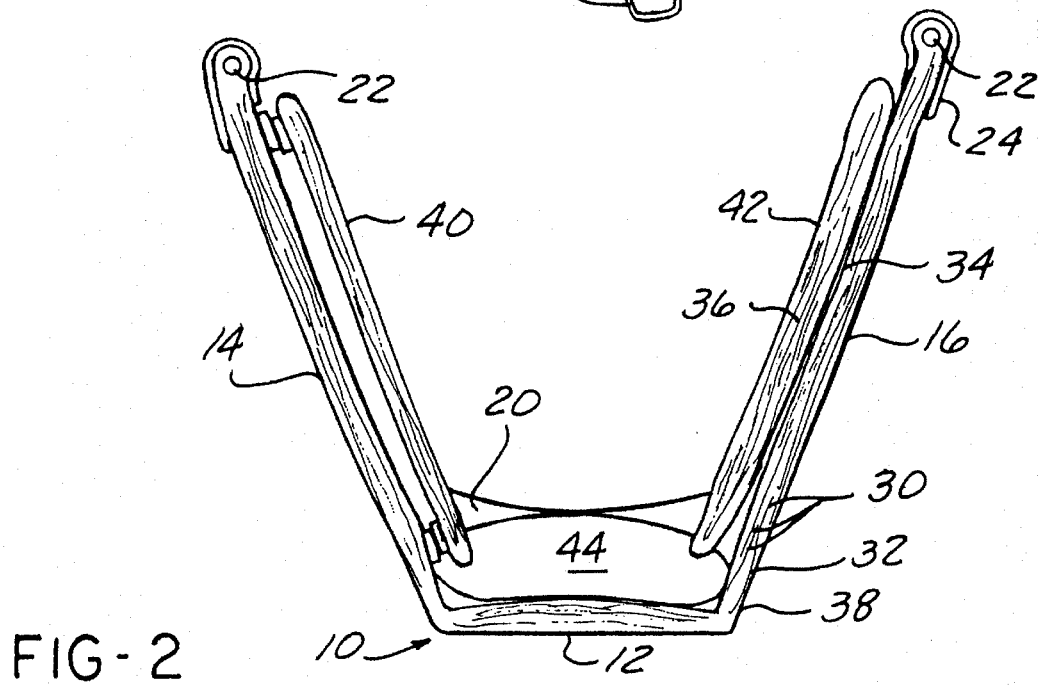
FIG. 2 is a transverse sectional view of the blanket, taken on a plane perpendicular to the length of the car.
Figure 3:
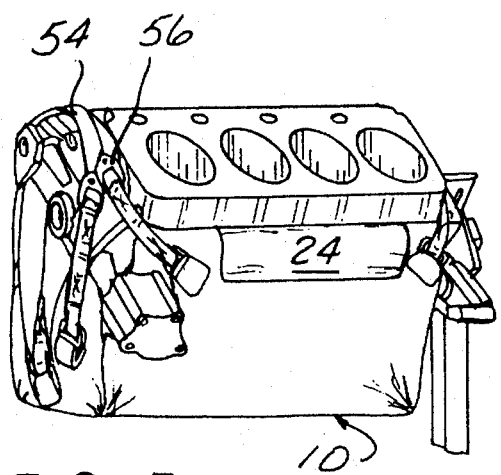
FIG. 3 is a perspective view, from the left front, of the blanket installed on an engine, shown without the headers in place for clarity.
Figure 4:
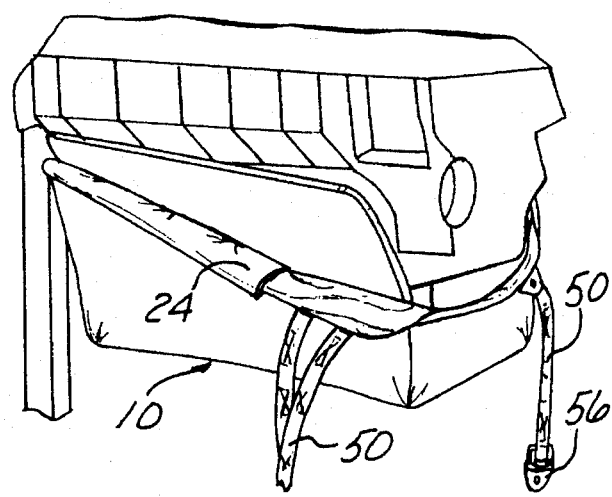
FIG. 4 is an enlarged view of the installed blanket, from the right front.

A shielding blanket embodying the invention includes a bag 10 (see FIGS. 1–4) shaped to fit around the lower end of an engine, that is, the engine block and oil pan. The bag is constructed from a laminate material blank having a bottom panel 12 that fits under the bottom of the oil pan, two side panels 14,16 that extend over the sides of the engine block, and two short end panels 18,20 that cover the ends of the oil pan. The end and side panels are joined by sewing with a Kevlar thread, as described below. "Kevlar" is a registered trademark of Dupont for a proprietary aromatic polyamide fiber of great strength. The word is capatalized throughout this document to connote its trademark status.

Each side upper edge is reinforced by a ⅝ inch diameter 4130 steel tube 22 having a 0.058 wall. Each tube is capped at both ends, and then sewn into the blanket. The tubes hold the bag rigid against block, keeping them out of contact with the headers, and discouraging oil from spilling over the top edge. A patch 24 of reflective material, described below, is applied along the top edge of each side panel, to reflect heat radiating from the headers.

The blanket is not of uniform thickness or construction; however, the entire blanket preferably has at least four layers of a high-temperature, high-strength textile ballistic material. High strength is needed to retain parts in the event of an engine explosion, while high temperature tolerance is needed to maintain sufficient strength, in the event of a fire in the engine compartment. Ballistic nylon material may have adequate strength at ordinary temperatures; however, its low melting point (about 400° F.) is a drawback, and thus Kevlar is presently preferred.

Kevlar has been found to supply both greater ballistic strength and temperature tolerance. Kevlar is substantially stronger than nylon (about 400,000 psi tensile strength, compared to about 140,000 psi for nylon). More important, however, is its grossly higher melting point: Kevlar retains its strength up to about 800° F.

The blanket of this invention comprises: (a) several layers 30 of a ballistic material, that is, a high-strength material chosen for its ability to resist penetration by high-velocity objects, (b) outer layers 32,34 of a reflective material, (c) inner layers 36 of an oil-absorbent material, and preferably (d) an outer cosmetic layer 38.

The preferred outer cosmetic and wear resistant layer is a black nylon Cordura material which would disintegrate harmlessly in the event of an external fire. It is not discussed further, as it does not contribute to the functionality of the invention.

The ballistic plies are preferably a Kevlar basket weave ballistic material, style 1320, having a 1500 denier and weighing 14.2 ounces per square yard. This material meets Milspec C-44050 type 2 class 1. While four layers are used throughout the blanket, more are added (up to ten total) in critical areas such as the side panels.

The reflective layers serve primarily to reflect heat from a fire and thus slow temperature rise in the inner layers. A seven-ounce Kevlar twill having a double "mirror" finish is preferred. Besides reflecting heat, it prevents oil from soaking the bag during ordinary use.

The oil absorbent material is contained in two or three separate pads 40,42 and optionally 44. Two large pads are positioned to face the sides of the engine block. The right side pad 40 attaches inside the bag with velcro, while ordinarily the left side pad 42 does not, since it has to be installed around the oil line before the bag is applied. A small rear pad may be installed, if desired, at the rear of the bag, facing the rear of the oil pan, is attached to the bag by Velcro fasteners.

Figure 9:
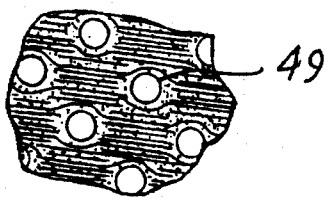
FIG. 9 is a photograph showing the texture of a jersey material that covers the pads shown in FIGS. 6–8.
Figure 8:
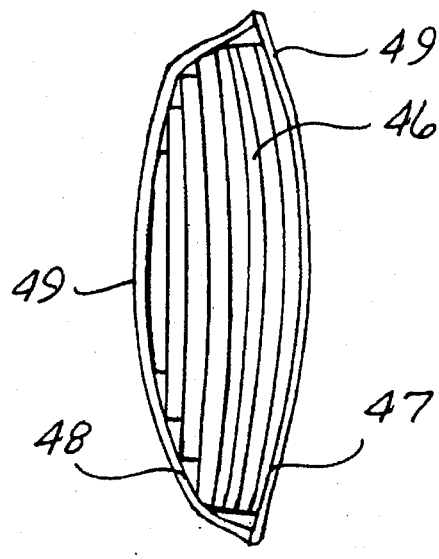
FIG. 8 is a sectional view taken on the line 8—8 in FIG. 7.

Each pad comprises eight layers of a hydrophobic polypropylene material 46 (FIG. 8). Such material absorbs oil fast—up to about twenty-five times its own weight—but it does not absorb water. It is captured between two layers of a Kevlar non-woven fabric 47,48 which do not impede absorption. These layers are not strong, so they are covered by a nylon jersey scrim material 49, illustrated in FIG. 9, to protect against tears during installation. While polypropylene is presently preferred, other absorbent materials may be used, for example wool.

The bag is supported on the engine by Kevlar webbing straps, which should have strength and temperature resistance similar to that of the bag; otherwise, the bag could be prematurely dislodged, and fail in its intended functions. The preferred straps meet Milspec T-8731-0 Type X class 9.6 An additional belt goes around the bag.

Figure 5:
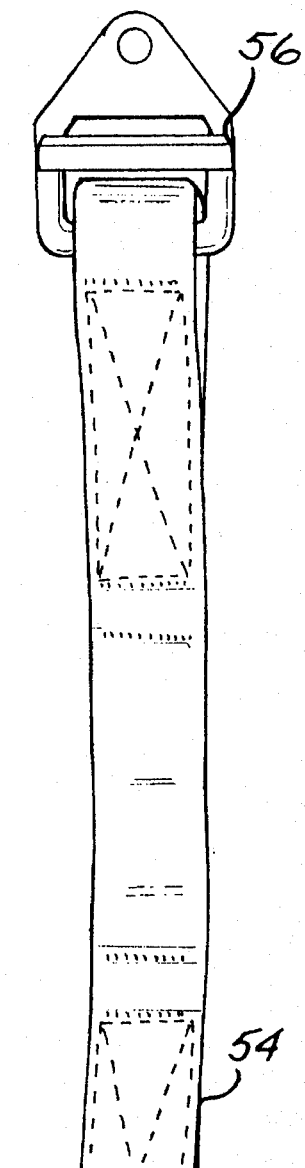
FIG. 5 is a detailed view of a strap for retaining the blanket on the engine.
Figure 6:
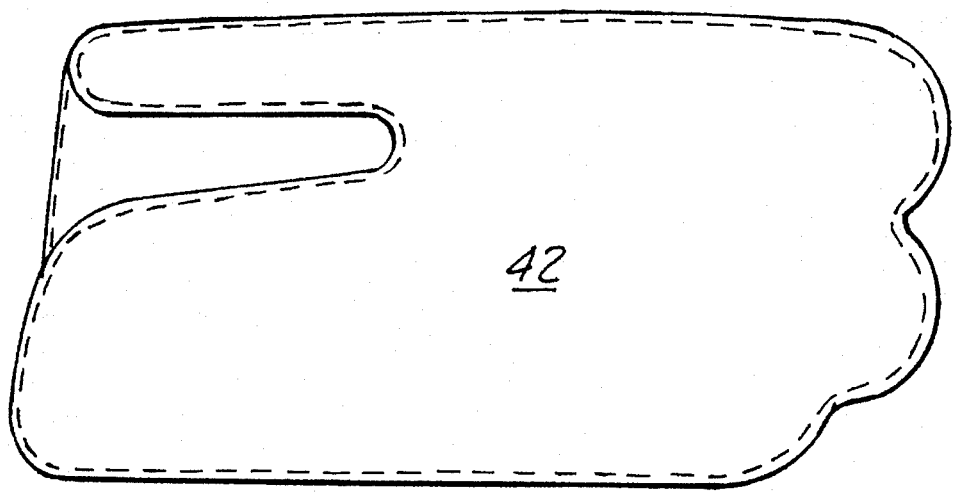
FIG. 6 is an elevation of an oil absorbent pad to be installed on the left side of the engine.
Figure 7:
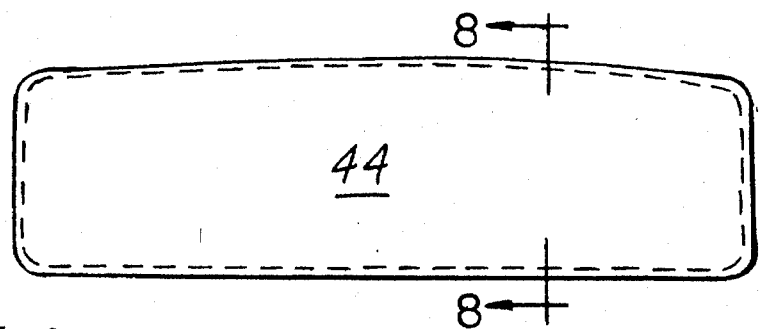
FIG. 7 shows an optional pad for placement at the rear of the engine.

Six lower straps 50 (FIG. 5) are sewn to the bag. On each side, two of these form a "V" where they meet near the front of the bottom panel. They are sewn into the bag with Kevlar threads having a fifty pound rated strength, inside the reflective layers 51 which protect them from radiant heating in case of fire. Each lower strap terminates at a metal "D" ring 52 (FIG. 1) having a strength of 5000 pounds. The exposed portion of each lower strap is covered with a reflective material, as described above.

Each of the D-rings provides an anchor to which an upper strap 54 is attached by a necktie hitch. The upper straps have nylon webbing jackets, chosen for their appearance, containing a Kevlar belt rated at about 4500 pounds. The ends of the upper straps, six in all, are interconnected in pairs over the engine, front and rear, by quick-release clasps 56 whose edges are polished, to avoid damaging the nylon webbing material at loads of up to 3500 pounds.

The blanket described above, including hardware, weighs about seven and a half pounds.

Kevlar is presently the best available material, where specified for this invention, because of its high strength and temperature tolerance. However, the invention should not be regarded as limited to a particular material, but rather to a particular combination of characteristics. It seems likely that new materials will be developed which may be superior to Kevlar for this invention. A new material "Technora", for example, is said to maintain its strength to over 938° F. The claims that follow are intended to cover all ballistic high-strength (at least as high as nylon), high-temperature (at least as high as nylon) materials.

Since the invention is subject to these and other modifications and variations, it is intended that the foregoing description and the accompanying drawings shall be interpreted as illustrative of only one form of the invention, whose scope is to be measured by the following claims.

I claim:

1. A shielding blanket for a running internal combustion engine having a cylinder block, an oil pan affixed below the block for containing oil therein, and exhaust headers for conducting hot exhaust gases away from the engine, said blanket comprising:

a bag constructed of high-strength textile material, said bag being constructed to fit closely over the cylinder block and oil pan of the engine, and between the block and the exhaust headers, wherein the bag comprises a bottom panel to go under the oil pan, and two side panels to cover respective sides of the engine block;

means for holding the bag in place on the engine;

means secured within the bag for rapidly absorbing engine oil, at least some of said means being disposed to face the sides of the cylinder block and thereby prevent oil escaping through the block or the oil pan from reaching the engine's exhaust headers; and high-temperature lower straps sewn into the blanket and having terminations at each upper corner of each side panel, and wherein the holding means comprise high-temperature upper straps secured to said terminations and having quick-release connections that can be applied over the top of the engine to hold the blanket on.

2. The invention of claim 1, wherein the upper and lower straps are interconnected by means of D-rings.

3. The invention of claim 1, wherein the absorbing means is wool.

4. A shielding blanket for a running internal combustion engine having a cylinder block, an oil pan affixed below the block for containing oil therein, and exhaust headers for conducting hot exhaust gases away from the engine, said blanket comprising:

a bag constructed of high-strength textile material, said bag being constructed to fit closely over the cylinder block and oil pan of the engine, and between the block and the exhaust headers, wherein the bag comprises a bottom panel to go under the oil pan, and two side panels to cover respective sides of the engine block;

means for holding the bag in place on the engine;

means secured within the bag for rapidly absorbing engine oil, at least some of said means being disposed to face the sides of the cylinder block and thereby prevent oil escaping through the block or the oil pan from reaching the engine's exhaust headers; and a pair of reinforcements, one secured within the blanket along the top edge of either side panel to keep the top edge flat against the engine.

5. The invention of claim 4, wherein each of said reinforcements is a metal tube having capped ends.

6. A shielding blanket for a running internal combustion engine having a cylinder block, an oil pan affixed below the block for containing oil therein, and exhaust headers for conducting hot exhaust gases away from the engine, said blanket comprising:

a bag constructed of high-strength textile material, said bag being constructed to fit closely over the cylinder block and oil pan of the engine, and between the block and the exhaust headers;

means for holding the bag in place on the engine; and means secured within the bag for rapidly absorbing engine oil, at least some of said means being disposed to face the sides of the cylinder block and thereby prevent oil escaping through the block or the oil pan from reaching the engine's exhaust headers, wherein the absorbing means is hydrophobic.

7. The invention of claim 6, wherein the bag comprises a bottom panel to go under the oil pan, and two side panels to cover respective sides of the engine block.

8. The invention of claim 7, further comprising a pair of end panels to cover respective ends of the oil pan, each end panel being sewn along either edge to a respective side panel.

9. The invention of claim 6, wherein said absorbing means is sufficient to absorb six quarts of oil.

10. The invention of claim 6, further comprising a piece of Kevlar material sewn on either side of the absorbent material to form a pillow.

11. The invention of claim 10, wherein the pillow is secured within the blanket by a hook-and-loop fastener.

12. The invention of claim 6, wherein said high-strength material comprises Kevlar threads.

13. The invention of claim 12, wherein said high-strength material is a Kevlar basket-weave ballistic textile.

14. The invention of claim 12, wherein said high-strength material is a Kevlar knit ballistic material.

15. The invention of claim 12, comprising at least four layers of said ballistic textile.

16. The invention of claim 12, further comprising at least one layer of a heat-reflective Kevlar material.

17. The invention of claim 16, wherein said layers are interconnected by sewing with Kevlar threads.

18. A shielding blanket for a running internal combustion engine having a cylinder block, an oil pan affixed below the block for containing oil therein, and exhaust headers for conducting hot exhaust gases away from the engine, said blanket comprising:

a bag constructed of high-strength textile material, said bag being constructed to fit closely over the cylinder block and oil pan of the engine, and between the block and the exhaust headers;

means for holding the bag in place on the engine; and means secured within the bag for rapidly absorbing engine oil, at least some of said means being disposed to face the sides of the cylinder block and thereby prevent oil escaping through the block or the oil pan from reaching the engine's exhaust headers, wherein the absorbing means is a polypropylene fabric.

* * * * *